(12) United States Patent
Mallempati et al.

(10) Patent No.: US 8,732,192 B2
(45) Date of Patent: May 20, 2014

(54) SEARCHING FOR WEB PAGES BASED ON USER-RECALLED WEB PAGE APPEARANCE

(75) Inventors: Vandana Mallempati, Austin, TX (US); Jehan S. Moghazy, New York, NY (US); Suparna S. Roy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/406,899

(22) Filed: Feb. 28, 2012

(65) Prior Publication Data
US 2013/0226956 A1  Aug. 29, 2013

(51) Int. Cl.
*G06F 17/30* (2006.01)

(52) U.S. Cl.
USPC ............... 707/769; 707/748; 715/243

(58) Field of Classification Search
None
See application file for complete search history.

(56) References Cited

U.S. PATENT DOCUMENTS

| | | | |
|---|---|---|---|
| 7,657,100 B2 | 2/2010 | Gokturk et al. | |
| 2008/0033996 A1 | 2/2008 | Kesari | |
| 2009/0187554 A1* | 7/2009 | Dugan et al. | 707/5 |
| 2009/0287657 A1 | 11/2009 | Bennett | |
| 2010/0166339 A1 | 7/2010 | Gokturk et al. | |
| 2011/0022599 A1 | 1/2011 | Chidlovskii et al. | |

OTHER PUBLICATIONS

Fonseca et al., "Sketch-a-Doc: Using Sketches to Find Documents," date provided by searcher May 31, 2011.

Hashimoto et al., "Retrieving Web Page Layouts using Sketches to Support Example-based Web Design," Eurographics Workshop on Sketch-Based Interfaces and Modeling, 2005. Copyright—The Eurographics Association 2005.

Hendrickson, Mark, "Yahoo Radically Opens Web Search with BOSS," Jul. 9, 2008, copyright TechCrunch 2011. <http://techcrunch.com/2008/07/09/yahoo-radically-opens-web-search-with-boss/>.

Juasiripukdee et al., "Clustering search results of non-text user generated content," 2010 Fifth International Conference on Digital Information Management (ICDIM), pp. 95-100, Jul. 5-8, 2010.

Miyamoto et al, "Visually Searching the Web for Structural Content," Vinci '10: Proceedings of the 3rd International Symposium on Visual Information Communication, Beijing, China, Sep. 28-29, 2010. ACM.

Slawski, Bill, "The Importance of Page Layout in SEO." Mar. 2, 2008. <http://www.seobythesea.com/?p=1009>.

(Continued)

*Primary Examiner* — Tony Mahmoudi
*Assistant Examiner* — Umar Mian
(74) *Attorney, Agent, or Firm* — Arnold Bangali; Mark Vallone

(57) ABSTRACT

In a method for searching for a previously visited web page, a first computer receives a plurality of search parameters from a second computer. The plurality of search parameters include a parameter identifying a characteristic of an element of a previously visited web page and a parameter identifying a weight of confidence in a recollection of a user that the element has the characteristic. The first computer searches for the characteristic of the element in a database including one or more characteristics of elements of indexed web pages. The first computer finds a match between the characteristic of the element and a characteristic of an element of an indexed web page of the indexed web pages. The first computer creates a list including an identification of the indexed web page. The first computer sends the list to the second computer.

10 Claims, 9 Drawing Sheets

(56) References Cited

OTHER PUBLICATIONS

Watai et al., "View-Based Web Page Retrieval using Interactive Sketch Query," IEEE International Conference on Image Processing, 2007. ICIP 2007. vol. 6, pp. VI-357-VI-360, Sep. 16-Oct. 19, 2007.

Wikipedia, "Least Squares," date printed Jul. 6, 2011; URL page last modified Jun. 30, 2011. <http://en.wikipedia.org/wiki/Least_squares>.

"Wirify—The Web as Wireframes," Wirify services provided by Volkside Pty Ltd., copyright 2010-2011 Volkside. Web page printed Jul. 7, 2011 <http://www.wirify.com/>.

* cited by examiner

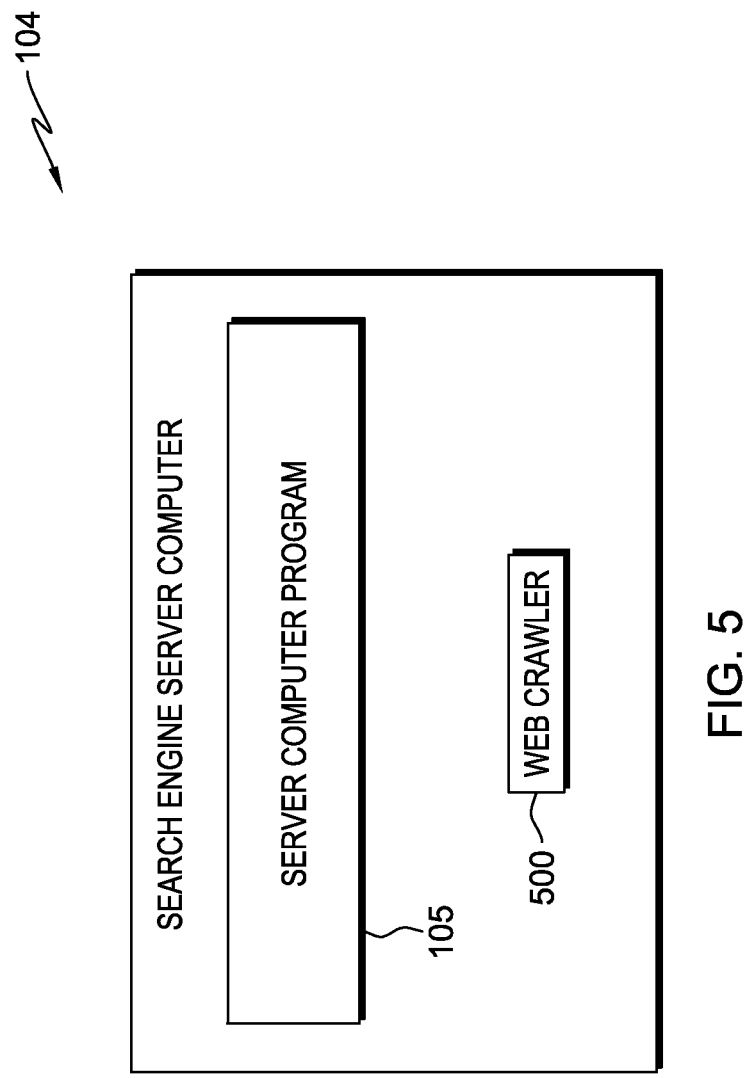

| SEARCH PARAMETERS 640 | | | |
|---|---|---|---|
| | WEIGHT | WEB PAGE ELEMENT TYPE | WEB PAGE ELEMENT POSITION | WEB PAGE ELEMENT SIZE |
| 642 — SEARCH PARAMETERS | 100% | IMAGE | POSITION A | 50 |
| 644 — SEARCH PARAMETERS | 50% | BANNER | POSITION F | 40 |

622 →

| ELEMENT TYPES | ELEMENT POSITIONS | ELEMENT SIZES |
|---|---|---|
| IMAGE | POSITION A | 50 |
| BANNER | POSITION B | 40 |

624 →

| ELEMENT TYPES | ELEMENT POSITIONS | ELEMENT SIZES |
|---|---|---|
| IMAGE | POSITION C | 50 |
| BANNER | POSITION G | 40 |

626 →

| ELEMENT TYPES | ELEMENT POSITIONS | ELEMENT SIZES |
|---|---|---|
| IMAGE | POSITION G | 90 |
| BANNER | POSITION C | 50 |

FIG. 6B

SEARCHING FOR WEB PAGES BASED ON USER-RECALLED WEB PAGE APPEARANCE

TECHNICAL FIELD

The present invention relates generally to searching for web pages and more particularly to searching for web pages based on a user-recalled web page appearance.

BACKGROUND

Through the use of a user interface, such as a user interface of a web browser, a user can have access to web pages that contain information. One technique for finding specific web pages on the Internet or an intranet is through the use of a search engine. Search engines typically maintain an index of millions or billions of web pages and provide a web browser interface that can be used to search and access web pages by keywords and text phrases in the web pages. Some well known search engines include Google™ and Yahoo!®.

SUMMARY

In one embodiment, a method is provided for searching for a previously visited web page. The method includes a first computer receiving a plurality of search parameters from a second computer, the plurality of search parameters including a parameter identifying a characteristic of an element of a previously visited web page and a parameter identifying a weight of confidence in a recollection of a user that the element of the previously visited web page has the characteristic. The method further includes the first computer searching for the characteristic of the element of the previously visited web page in a database including one or more characteristics of elements of indexed web pages. The method further includes the first computer finding a match between the characteristic of the element of the previously visited web page and a characteristic of an element of an indexed web page of the indexed web pages. The method further includes the first computer creating a list including an identification of the indexed web page. The method further includes the first computer sending the list to the second computer.

In another example, a computer system for searching for a previously visited web page is provided. The computer system includes one or more computer-readable tangibles storage devices, one or more processors, and one or more computer-readable memories. The computer system further includes program instructions, stored on at least one of the one or more computer-readable tangible storage devices for execution by at least one of the one or more processors via at least one of the one or more computer-readable memories, to receive a plurality of search parameters from a computing device, the plurality of search parameters including a parameter identifying a characteristic of an element of a previously visited web page and a parameter identifying a weight of confidence in a recollection of a user that the element of the previously visited web page has the characteristic. The computer system further includes program instructions, stored on at least one of the one or more computer-readable tangible storage devices for execution by at least one of the one or more processors via at least one of the one or more computer-readable memories, to search for the characteristic of the element of the previously visited web page in a database including one or more characteristics of elements of indexed web page. The computer system further includes program instructions, stored on at least one of the one or more computer-readable tangible storage devices for execution by at least one of the one or more processors via at least one of the one or more computer-readable memories, to find a match between the characteristic of the element of the previously visited web page and a characteristic of an element of an indexed web page of the indexed web pages. The computer system further includes program instructions, stored on at least one of the one or more computer-readable tangible storage devices for execution by at least one of the one or more processors via at least one of the one or more computer-readable memories, to create a list including an identification of the indexed web page. The computer system further includes program instructions, stored on at least one of the one or more computer-readable tangible storage devices for execution by at least one of the one or more processors via at least one of the one or more computer-readable memories, to send the list to the computing device.

In another example, a computer program product for searching for a previously visited web page is provided. The computer program product includes one or more computer-readable tangible storage devices. The computer program product further includes program instructions, stored at least one of the one or more computer-readable tangible storage devices, to receive a plurality of search parameters from a computing device, the plurality of search parameters including a parameter identifying a characteristic of an element of a previously visited web page and a parameter identifying a weight of confidence in a recollection of a user that the element of the previously visited web page has the characteristic. The computer program product further includes program instructions, stored at least one of the one or more computer-readable tangible storage devices, to search for the characteristic of the element of the previously visited web page in a database including one or more characteristics of elements of indexed web page. The computer program product further includes program instructions, stored at least one of the one or more computer-readable tangible storage devices, to find a match between the characteristic of the element of the previously visited web page and a characteristic of an element of an indexed web page of the indexed web pages. The computer program product further includes program instructions, stored at least one of the one or more computer-readable tangible storage devices, to create a list including an identification of the indexed web page. The computer program product further includes program instructions, stored at least one of the one or more computer-readable tangible storage devices, to send the list to the computing device.

BRIEF DESCRIPTION OF THE SEVERAL VIEWS OF THE DRAWINGS

FIG. 5 is a functional block diagram illustrating program components of a search engine server in accordance with an embodiment of the present invention.

FIGS. 6A and 6B illustrate simplified block diagrams of an index database accessible to a search engine server in accordance with an embodiment of the present invention.

DETAILED DESCRIPTION

An important aspect of human memory recall is remembering the visual placement of physical elements. For example, in trying to recall a web page that a user has visited, the user may remember the appearance of the web page. More specifically, the user may remember, among other things, the visual placement or format of web page elements, and the types of the elements such as whether the elements were pictures, entry fields, drop down menus, etc. Embodiments of the present invention are directed to searching for web pages based on a user-recalled web page appearance.

In exemplary embodiments, a web page appearance based search may utilize weights assigned to elements of a web page arrangement constructed by the user, wherein the arrangement, according to the user's recollection, has of the appearance of the web page that the user has visited (and desires to visit again). Each of the weights may represent how well the user remembers one or more of a type, position, and size of a web page element on the visited web page. For instance, higher weights represent more confidence in the user's memory, and lower weights represent less confidence in the user's memory.

Embodiments of the present invention will now be described in detail with reference to the accompanying drawings.

Figure 1:
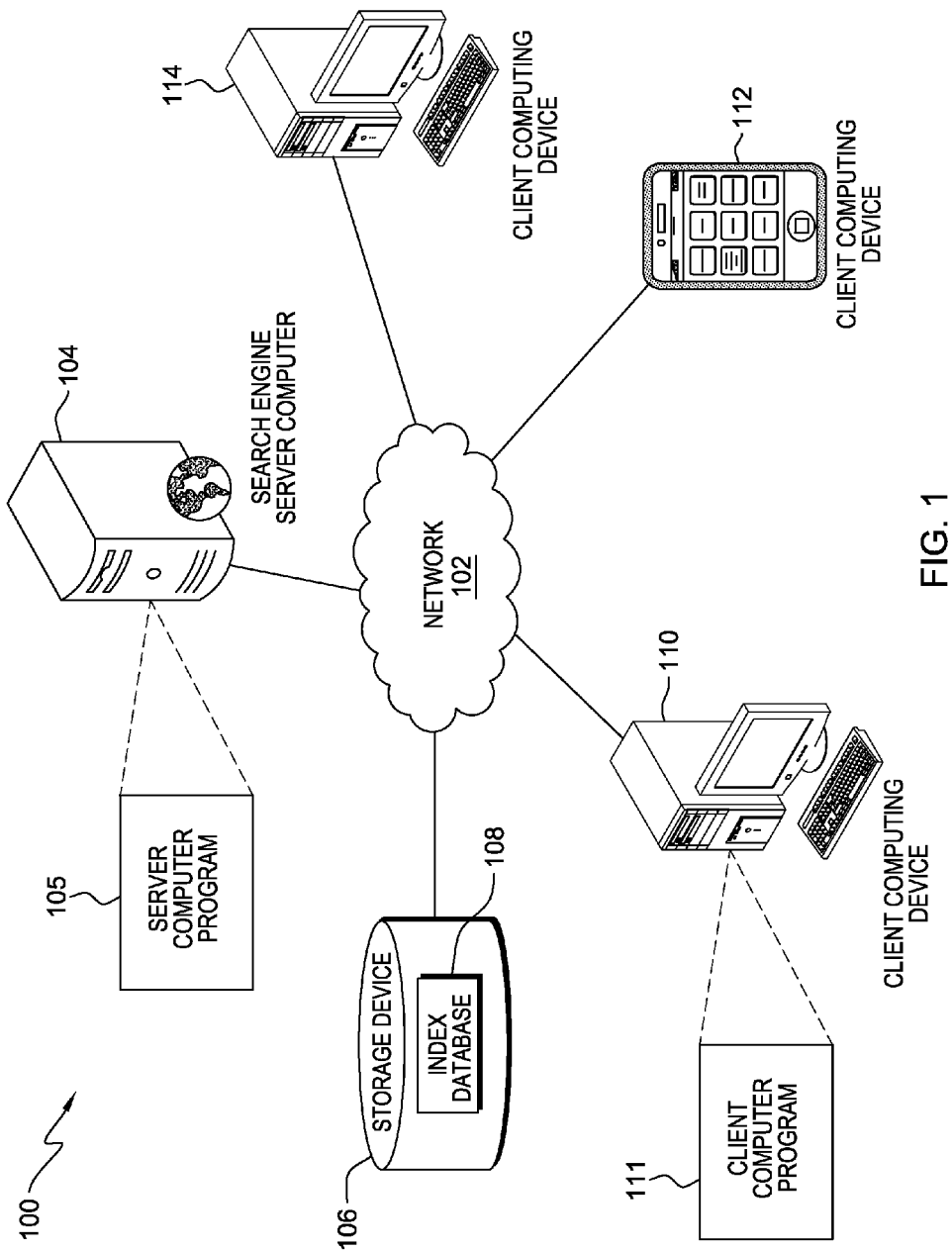
FIG. 1 is a functional block diagram of a web page appearance search system in accordance with an embodiment of the present invention.

FIG. 1 is a functional block diagram illustrating a web page appearance search system 100 in accordance with an embodiment of the present invention. Web page appearance search system 100 can include search engine server computer 104, storage device 106 containing index database 108, and client computing devices 110, 112, and 114. Search engine server computer 104, storage device 106, and client computing devices 110, 112, and 114 can all be interconnected over network 102.

Search engine server computer 104 can be, for example, a management server, a web server, or any other electronic device or computer capable of receiving and sending data. Search engine server computer 104 includes server computer program 105. Server computer program 105 can be software residing on a web server that delivers web page search results to client computing devices 110, 112, and 114.

Storage device 106 can be any type of storage device, storage server, storage area network, redundant array of independent discs (RAID), cloud storage service, or any type of data storage. Index database 108 can be a database of indexed web pages.

In the depicted example, client computing devices 110, 112, 114 can be a laptop, tablet, or netbook personal computer (PC), a desktop computer, a mainframe or mini computer, a personal digital assistant (PDA), or a smart phone such as a Blackberry®. Client computing device 110 includes client computer program 111. Client computer program 111 can be a web browser, a standalone web page search application, or part of a service that monitors and interacts with a web browser or web page search application.

Network 102 may include one or more networks of any kind that may provide communications links between various devices and computers connected together within web page appearance search system 100. Network 102 may include connections, such as wire, wireless communication links, or fiber optic cables. In one example, network 102 is the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network 102 may also be implemented as a number of different types of networks, such as for example, an intranet, a local area network (LAN), or a wide area network (WAN). Client computing device 110 can communicate over network 102 with search engine server computer 104 to facilitate a web page search.

Figure 2:
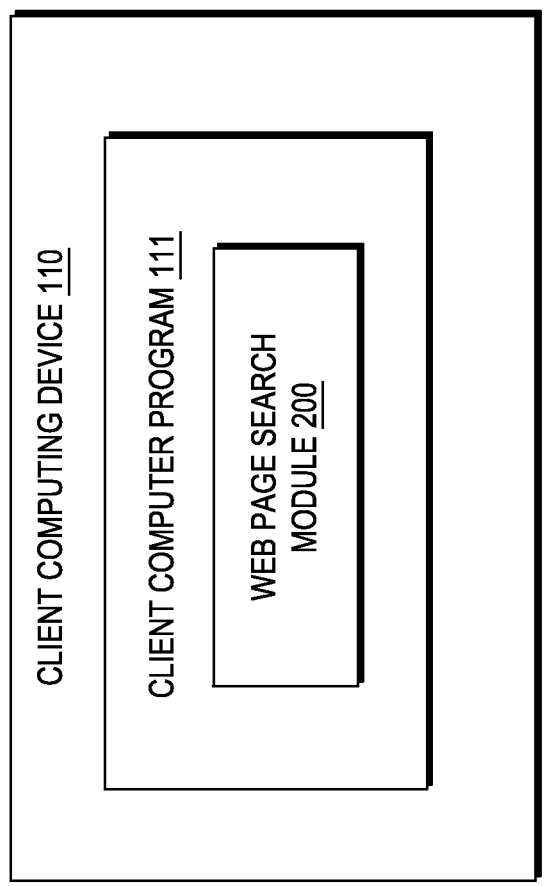
FIG. 2 is a functional block diagram illustrating program components of a client computing device in accordance with an embodiment of the present invention.

FIG. 2 is a functional block diagram illustrating components of client computing device 110 in accordance with an embodiment of the present invention. Client computing device 110 includes client computer program 111. Client computer program 111 can, among other things, retrieve and display content accessible via network 102, such as web pages. In at least one embodiment, client computer program 111 is a web browser. Examples of web browsers include Internet Explorer®, Firefox®, Safari® and Google Chrome™.

Client computer program 111 includes web page search module 200. In at least one embodiment, web page search module 200 is a web browser plugin/add-on that extends the functionality of client computer program 111 by adding additional user interface elements to a user interface of client computer program 111. The additional user interface elements allow the user to construct an arrangement of a web page that, according to the user's recollection, has the appearance of a web page that the user has previously visited and desires to visit again. In at least one embodiment, web page search module 200 includes a web page received in client computer program 111 from a web server program. In at least one embodiment, search engine server computer 104 can include the web server program. In at least one embodiment, the web page received in client computer program 111 can include program code, such as HyperText Markup Language (HTML) code or JavaScript code that, when executed, adds the additional user interface elements to the user interface of client computer program 111.

Figure 3:
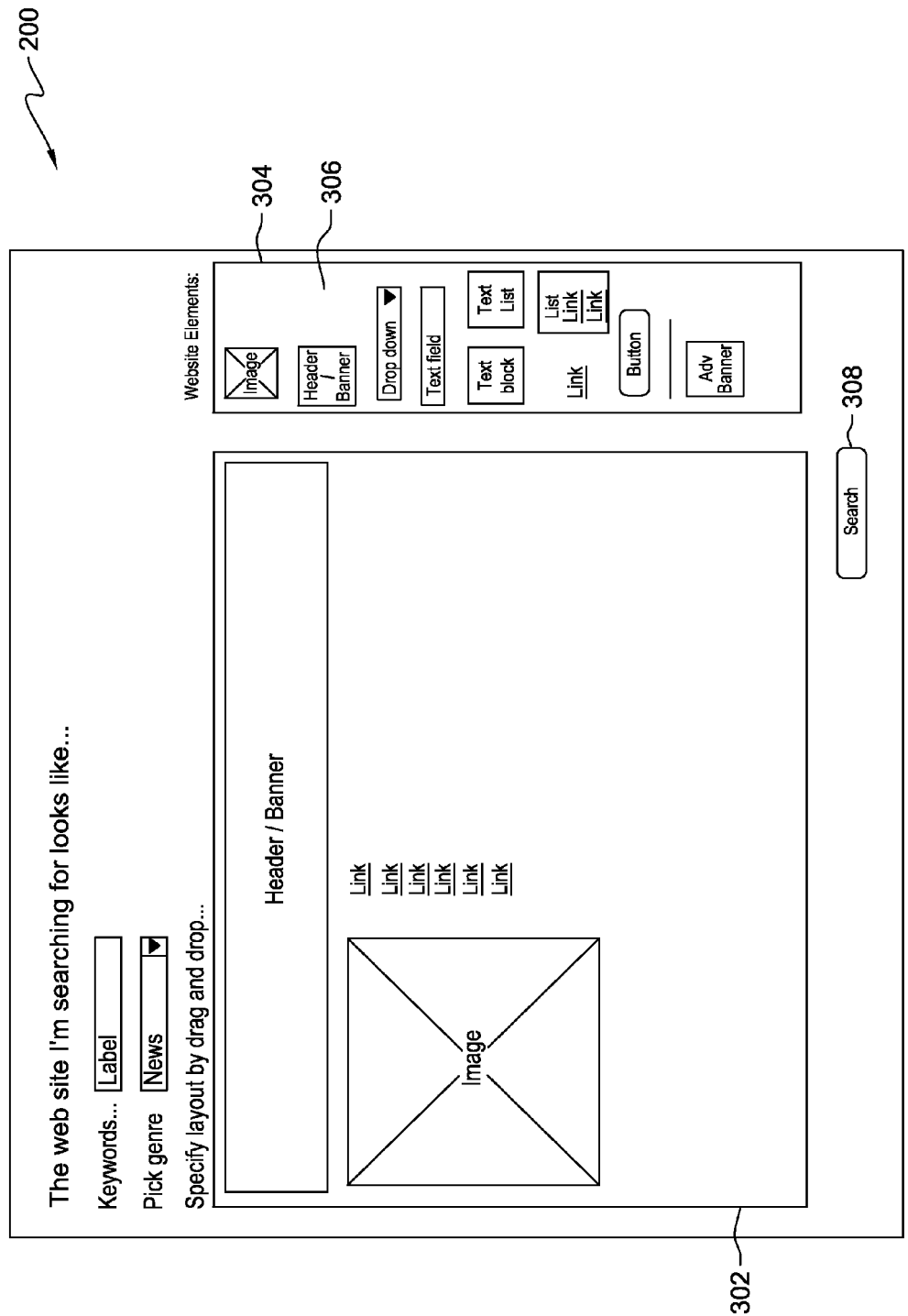
FIG. 3 is an exemplary view of user interface elements added to a user interface of a client computer program by a web page search user module in accordance with an embodiment of the present invention.

FIG. 3 is an exemplary view of user interface elements added to a user interface of client computer program 111 by web page search module 200 in accordance with an embodiment of the present invention. In the depicted example, web page search module 200 populates the user interface of client computer program 111 with web page element types 304 including image element types, header/banner element types, text list element types, etc. Web page element types 304 can be displayed in element type selection area 306 of the user interface of client computer program 111.

Web page search module 200 allows a user to arrange web page element types 304 on canvas 302 in a layout according to the user's recollection of a web page that the user has previously visited and desires to visit again. In at least one embodiment, the user can drag and drop one or more of web page element types 304 from selection area 306 onto canvas 302. In at least one embodiment, the user can copy one or more of web page element types 304 from selection area 306 and paste the copied one or more web page element types 304 onto canvas 302. In at least one embodiment, the user can resize one or more web page element types 304 dropped or copied onto canvas 302.

In a preferred embodiment, web page search module 200 automatically assigns weights to web page element types 304 arranged on canvas 302. Web page search module 200 can assign the weights based on the order in which the user places one or more of web page element types 304 on canvas 302. Alternatively, the user can manually assign weights to one or more of web page element types 304 arranged on canvas 302. In at least one embodiment, each weight assigned to a web page element of web page element types 304 arranged on canvas 302 can represent the user's confidence in his or her recollection that the web page element is: (1) arranged on canvas 302 in the same position that it appears on a web page that the user previously visited and desires visit again; (2) of a same type as a web page element at the same position on the web page that the user previously visited and desires visit again; and/or (3) of a same size as a web page element at the same position on the web page that the user previously visited and desires visit again. In at least one embodiment, each weight assigned to a web page element of web page element types 304 arranged on canvas 302 can represent the user's confidence in his or her recollection that the web page element is present on the web page that the user previously visited and desires visit again.

In at least one embodiment, higher weights represent more confidence in the user's recollection, and lower weights represent less confidence in the user's recollection. For example, in a preferred embodiment, by default, web page search module 200 assigns the highest weight to a first of web page element types 304 that is placed on canvas 302, and web page search module 200 assigns progressively lower weights for each consecutive web page element type 304 placed onto canvas 302. Thus, the weighting process is entirely hidden from the user. The user can override this default through a configuration setting in client computer program 111 or web page search module 200.

The weights can be percentages, e.g., the user is 100% confident in his or her recollection that a first of web page element types 304 is arranged on canvas 302 in the same position that it appears on a web page that the user previously visited and desires visit again, the user is 50% confident in his or her recollection that a second of web page element types 304 is arranged on canvas 302 in the same position that it appears on the web page that the user previously visited and desires to visit again, and so on. In another embodiment, the user can rank each of web page element types 304 positioned on canvas 302 according to confidence, e.g., "1" for most confidence in his or her recollection that a first of web page element types 304 is arranged on canvas 302 in the same position that it appears on a web page that the user previously visited and desires visit again, "2" for the confidence in his or her recollection that a second of web page element types 304 is arranged on canvas 302 in the same position that it appears on the web page that the user previously visited and desires visit again, and so on.

In at least one embodiment, web page search module 200 determines search parameters including web page element types 304 arranged on canvas 302, their positions on canvas 302, their sizes, and their weights, and sends, for example via client computer program 111, the search parameters to server computer program 105 of search engine server computer 104 to perform a search for the web page that the user previously visited and desires to visit again. In at least one embodiment, client computer program 111 can send the search parameters to server computer program 105 in response to the user pressing search button 308.

Figure 4:
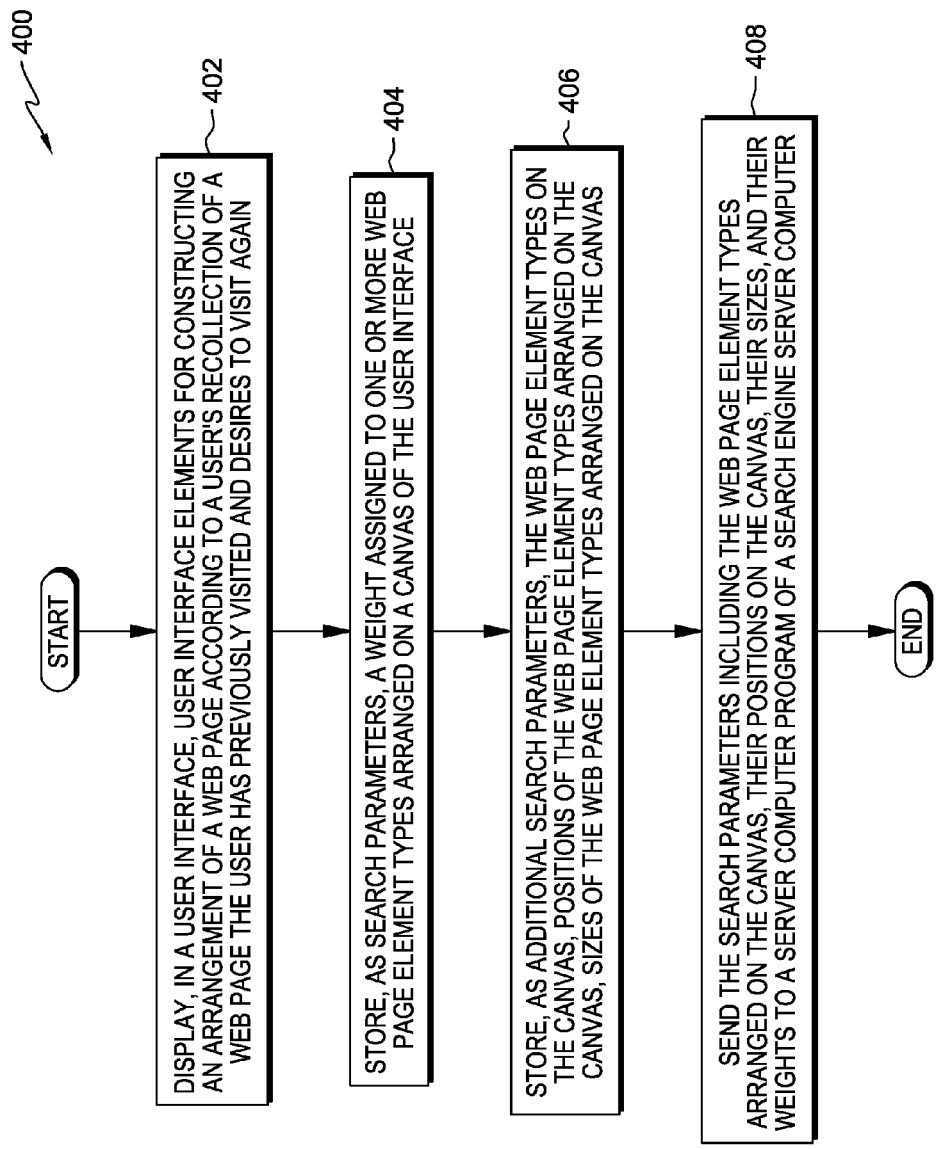
FIG. 4 is a flow diagram of a method 400 for obtaining parameters for a web page search based on user-recalled appearance of a visited web page in accordance with one embodiment of the present invention.

FIG. 4 is a flow diagram of a method 400 for obtaining parameters for a web page search based on user-recalled appearance of a visited web page in accordance with one embodiment of the present invention. At step 402, web page search module 200 displays, in a user interface of client computer program 111, user interface elements that allow a user to construct an arrangement of a web page that, according to the user's recollection, has the appearance of a web page that the user has previously visited and desires to visit again. The user interface elements can include canvas 302, web page element types 304, selection area 306, and search button 308.

At step 404, web page search module 200 stores in a computer-readable memory, as search parameters, a weight assigned as previously discussed to each of one or more web page element types 304 arranged on canvas 302. At step 406, web page search module 200 stores in a computer-readable memory, as additional search parameters, the web page element types 304 arranged on canvas 302, the positions of the web page element types 304 arranged on canvas 302, the sizes of the web page element types 304 arranged on canvas 302. In another embodiment, at step 406, web page search module 200 stores in the computer-readable memory, as the additional search parameters, only the web page element types 304 arranged on canvas 302. At step 408, web page search module 200 sends the search parameters stored in steps 404 and 406 to server computer program 105 of search engine server computer 104. In at least one embodiment, web page search module 200 performs step 408 in response to web page search module 200 detecting a user selection of search button 308.

FIG. 5 is a functional block diagram illustrating program components of search engine server computer 104 in accordance with an embodiment of the present invention. Search engine server computer 104 includes server computer program 105 and web crawler 500. Web crawler 500 operates to collect web pages over network 102 stores them in an index database accessible to server computer program 105. The index database can be, for example, index database 108 of FIG. 1.

As described, server computer program 105 receives search parameters from web page search module 200 of client computer program 111 of client computing device 110. The search parameters can include web page element types 304 arranged on canvas 302, the positions of the web page element types 304 arranged on canvas 302, the sizes of the web page element types 304 arranged on canvas 302, and weights of the web page element types 304 arranged on canvas 302. In at least one embodiment, the search parameters include only web page element types 304 arranged on canvas 302. Server computer program 105 uses the search parameters to query the index database. The result of the query represents a list of web pages that satisfy the search parameters.

In at least one embodiment, server computer program 105 performs the query by comparing the search parameters against element tables corresponding to multiple web pages in the index database. Server computer program 105 returns to client computing device 110 a search result list with identifiers of web pages in the index database that satisfy the search parameters. In response to receiving the search result list, client computer program 111 of client computing device 110 can display the search result list in a user interface of client computer program 111.

Figure 6A:
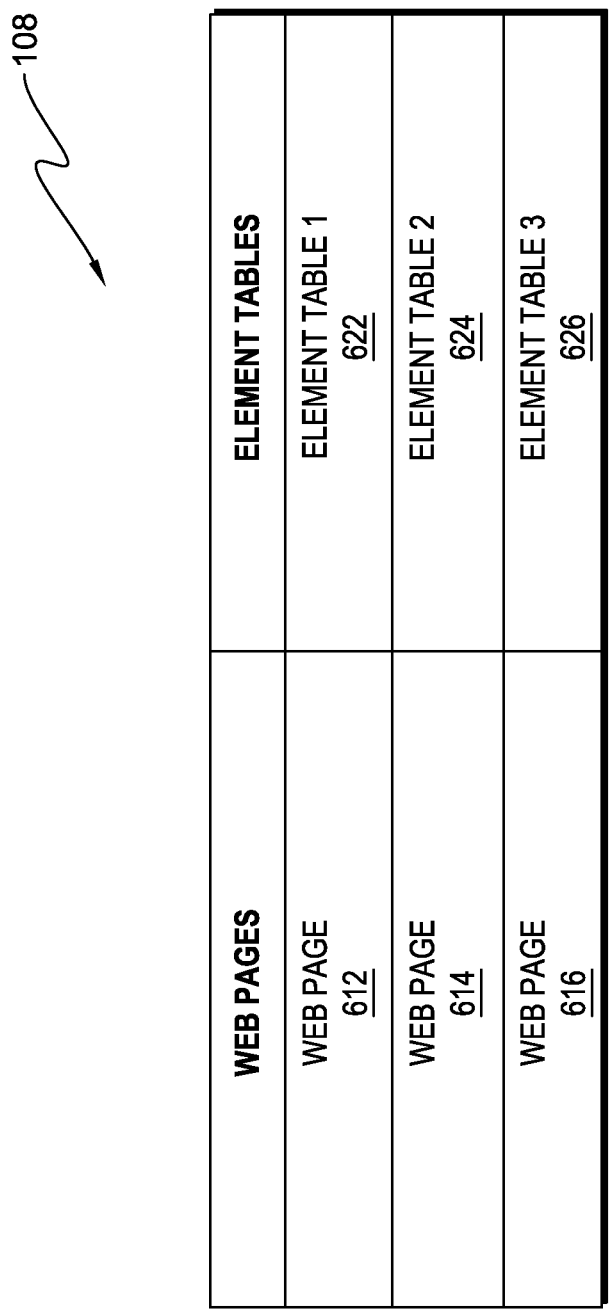

FIGS. 6A and 6B illustrate simplified block diagrams of an index database accessible to search engine server computer 104 in accordance with an embodiment of the present invention. The index database can be, for example, index database 108 of FIG. 1. Referring to FIG. 6A, web pages 612, 614, and 616 can be web pages or web page identifiers (such as Uniform Resource Identifiers (URIs) or Uniform Resource Locators (URLs)) stored in index database 108 by web crawler 500. Web crawler 500 can gather web pages 612, 614, and 616 for storage in index database 108 according to any known methods. Server computer program 105 builds element table 622 for web page 612, element table 624 for web page 614, and element table 626 for web page 616, as further discussed below with reference to FIG. 7. While in FIG. 6A, element tables 622, 624, and 626 are shown as part of the index database, one of skill in the art will appreciate that in other embodiments, element tables 622, 624, and 626 can be stored in a separate database, and the index database or the separate database can establish a relationship between web pages 612, 614, and 616 and element tables 622, 624, and 626, respectively.

FIG. 6B is an illustrative block diagram of search parameters 640 for comparison against element tables 622, 624, and 626. In response to receiving search parameters 640 from client computing device 110, server computer program 105 queries index database 108 by comparing search parameters 640 against element tables 622, 624, and 626. Server computer program 105 returns to client computing device 110 a search result list with identifiers of those of web pages 612, 614, and 616 in the index database 108 that satisfy search parameters 640. In at least one embodiment, server computer program 105 includes in the search result list those of web pages 612, 614, and 616 having web page elements in a corresponding element table 622, 624, 626 that satisfy search parameters 640.

In at least one embodiment, in comparing search parameters 640 against element tables 622, 624, and 626, server computer program 105 first compares those of search parameters 640 having a weight of 100%. In at least one embodiment, in response to determining that the web page element type, web page element position, and web page element size of those of search parameters 640 having a weight of 100% are not found in element tables 622, 624, and 626, server computer program 105 returns no search results to client computing device 110, and may, in at least one embodiment, return a message to client computing device 110 indicating that no search results were found. In at least one embodiment, in response to determining that the web page element type of those of search parameters 640 having a weight of 100% is not found in element tables 622, 624, and 626, server computer program 105 returns no search results to client computing device 110

In the embodiment of FIG. 6B, server computer program 105 first compares first search parameters 642 of search parameters 640 against element tables 622, 624, and 626. First search parameters 642 include a weight of 100%, a web page element type of "image", a web page element position of position A, and a web page element size of 50. As shown, each of element tables 622, 624 and 626 contain an "image" element type, and element tables 622 and 624 include an "image" element type having a size of 50. However, only element table 622 contains an "image" element type at position A with a size of 50. Accordingly, in at least one embodiment, server computer program 105 includes in a list of search results to return to client computing device 110 identifiers of indexed web pages having a corresponding element table that identifies an element having a type, position, and size that match, within a threshold level of tolerance, the type, position, and size, respectively, in those of search parameters 640 having a weight of 100% (e.g., an identifier of web page 612 having corresponding element table 622 which identifies a web page element having an "image" element type at position A with a size of 50). In at least one embodiment, the threshold level of tolerance can be sent by client computer program 111 to server computer program 105 as one of search parameters 640.

In at least one embodiment, search parameters 640 may include only one or more weights and one or more web page element types, and element tables 622, 624, and 626 may include only an element types column. Accordingly, first search parameters 642 may include only a weight of 100% and a web page element type of "image," element tables 622, 624, and 626 may include only element types of "image" and "banner", and server computer program 105 may include in the list of search results identifiers of each of web pages 612, 614, and 616 because an "image" is present in each of web pages 612, 614, and 616.

In at least one embodiment, after comparing those of search parameters 640 having a weight of 100% to element tables 622, 624, and 626, server computer program 105 continually compares next search parameters of search parameters 640 having a next highest weight until all search parameters of search parameters 640 have been compared to element tables 622, 624, and 626. For example, after server computer program 105 compares first search parameters 642 of search parameters 640 against element tables 622, 624, and 626, server computer program compares second search parameters 644, which include a weight of 50%, to element tables 622, 624, and 626. As depicted, search parameters 644 include a web page element type of "banner", as do element tables 622, 624 and 626. In at least one embodiment, where search parameters 640 include only one or more weights and one or more web page elements and element tables 622, 624, and 626 include only element types, server computer program 105 determines that each of element tables 622, 624, and 626 each include an element type of "banner" and includes in the list of search results identifiers of each of web pages 612, 614, and 616 not already included in the list of search results. In at least one embodiment, server computer program 105 determines that search parameters 644 indicate a size of 40 for the banner element type, while element table 626 indicates a banner size of 50, and due to this mismatch, server computer program 105 does not include the banner of size 50 in element table 626 in the list of search results to return to client computing device 110. In at least one embodiment, server computer program 105 also determines that while both element tables 622 and 624 both indicate a banner of size 40, the banner of element table 622 is at position B and the banner of element table 624 is at position G, while the banner of search parameters 644 is at position F.

In at least one embodiment, server computer program 105 determines which of position B and position G is closer to position F, and identifies corresponding web page 612 or 614 having a banner closer to position F higher in the list of search results than the other of web pages 612 and 614. In at least one embodiment, server computer program 105 determines which of position B and position G is closer to position F by using any known method, such as a least squares fitting algorithm.

After server computer program has compared all search parameters 640 to element tables 622, 624, and 625, server computer program 105 sends the list of search results, or a message indicating that no results were found, to web page search module 200 for display on client computing device 110. In at least one embodiment, the list of search results include Uniform Resource Locators (URLs) of those of web pages 612, 614, and 616 included in the list.

Figure 7:
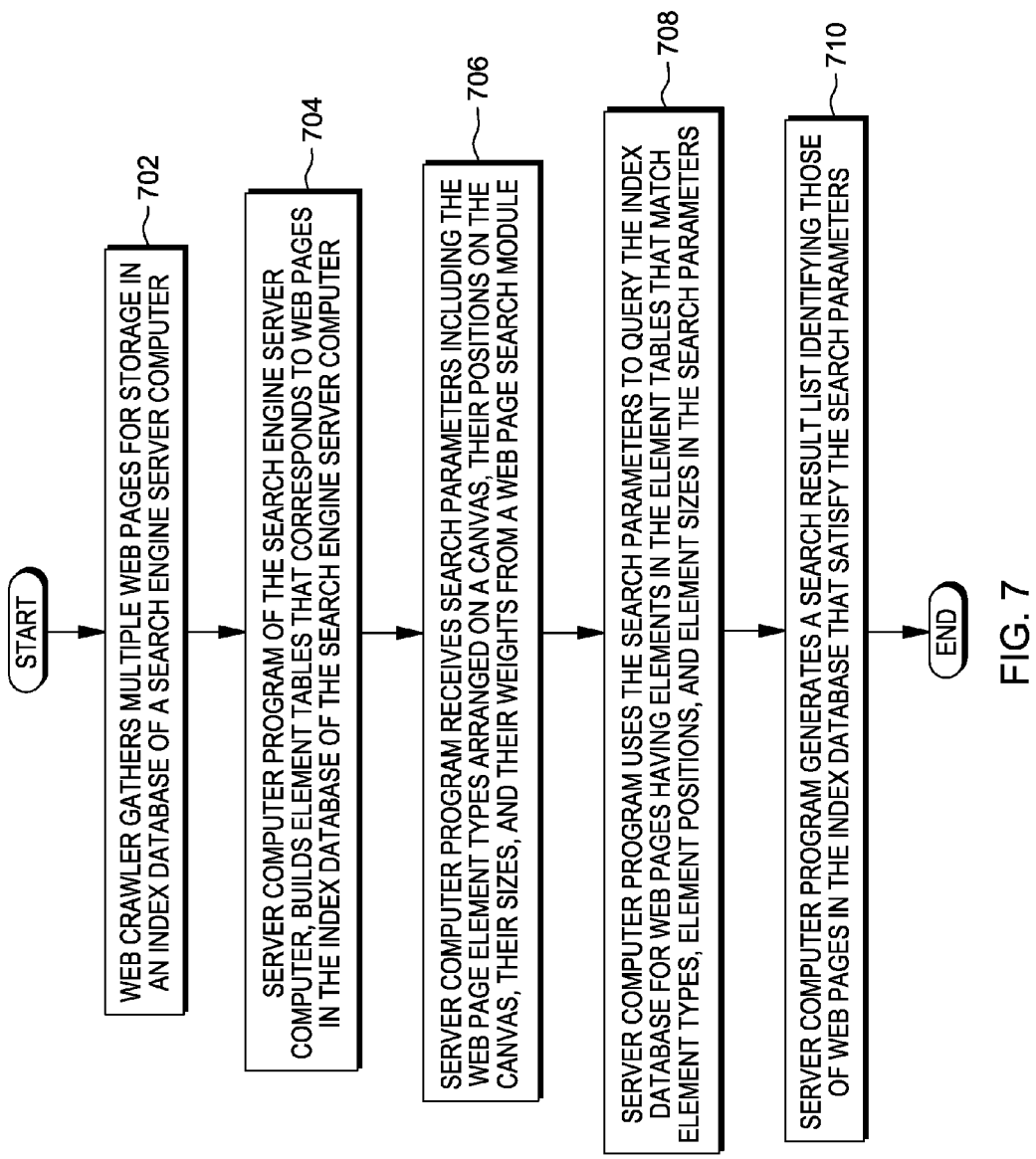
FIG. 7 is an exemplary flow diagram of a method 700 for generating a search result list for a web page search based on user-recalled appearance of a visited web page in accordance with one embodiment of the present invention

FIG. 7 is an exemplary flow diagram of a method 700 for generating a search result list for a web page search based on user-recalled appearance of a visited web page in accordance with one embodiment of the present invention. At step 702, web crawler 500 obtains web pages 612, 614, and 616 using any known methods that web crawlers use to index web pages.

At step 704, server computer program 105 builds element tables 622, 624, and 626 that correspond, respectively, to web pages 612, 614, and 616. In at least one embodiment, server computer program builds element tables 622, 624 and 626 that correspond to web pages 612, 614 and 616 by parsing through program code, for instance, HTML code of web pages 612, 614, 616, looking for particular tags. For example, if server computer program 105 finds <"img src=/pic1.jpg" "width=100" height=50"> at the beginning of the code in web page 612, then server computer program 105 knows that web page 612 includes an image element type with a size of 500 pixels at a first position in web page 612.

At step 706, server computer program 105 receives search parameters from web page search module 200. The search parameters include web page element types 304 arranged on the canvas 302, their positions on the canvas, their sizes, and their weights. At step 708 server computer program 105 uses the search parameters to query index database 108 for those of pages 612, 614, and 616 having elements in element tables 622, 624, and 626, respectively, that match element types, element positions, and element sizes in search parameters 640 by comparing search parameters 640 against element tables 622, 624, and 626. As previously discussed, in at least one embodiment, in performing the query, server computer program 105 first compares those of the search parameters having a weight of 100%, or "1", and then progressively compares next search parameters having a next lowest weight.

At step 710, server computer program 105 generates a search result list identifying those of web pages 612, 614, and 616 containing web pages in index database 108 that satisfy the search parameters 640. In at least one embodiment, server computer program 105 sends the search result list to web page search module 200 for display on client computing device 110.

Figure 8:
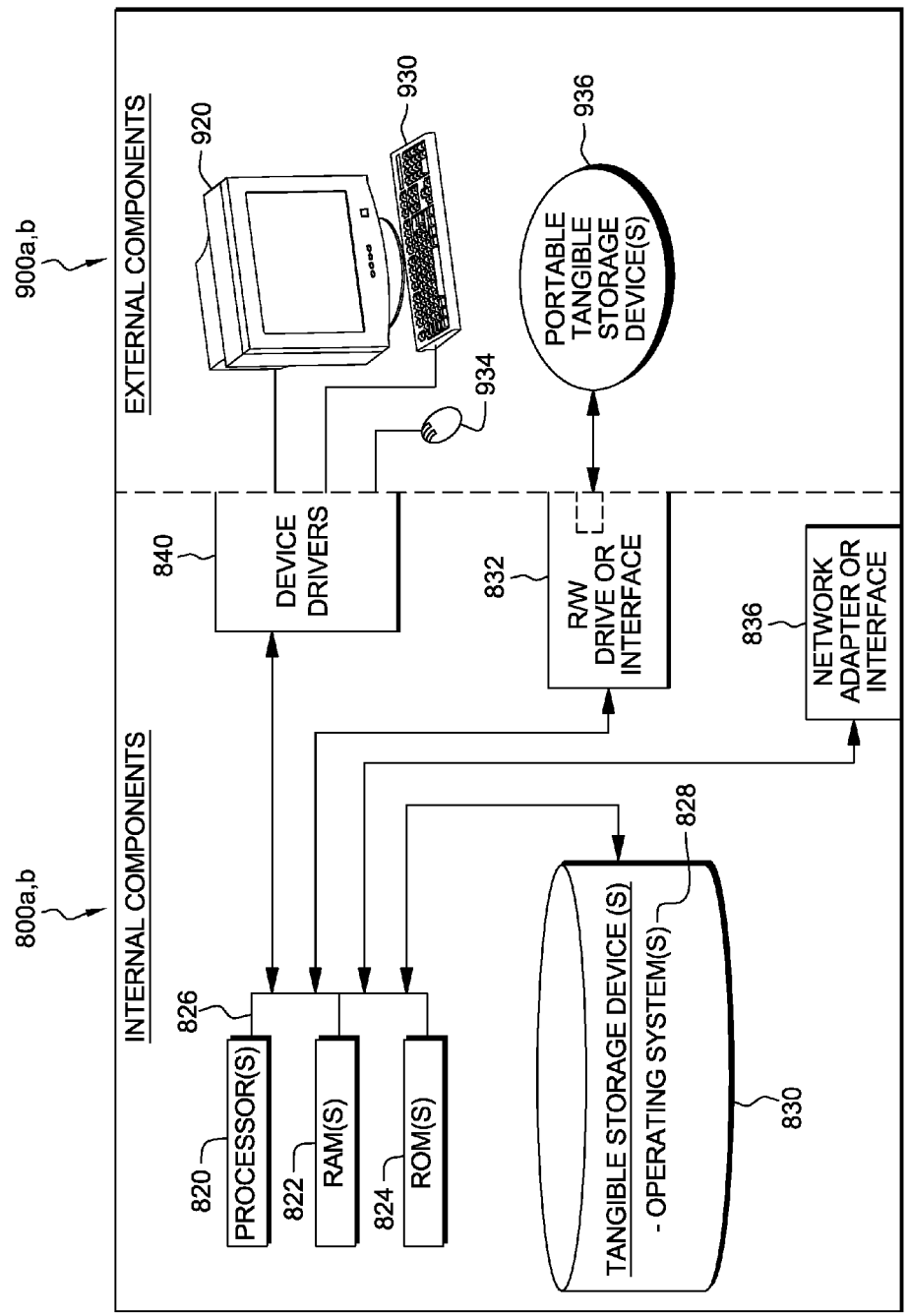
FIG. 8 is a block diagram of hardware and software components of a computer in accordance with one embodiment of the present invention.

FIG. 8 shows a block diagram of the components of a computer, such as search engine server computer 104 and client computing device 110, in accordance with an illustrative embodiment of the present invention. Search engine server computer 104 includes set of internal components 800a and set of external components 900a, and client computing device 110 includes set of internal components 800b and set of external components 900b. It should be appreciated that FIG. 8 provides only an illustration of one implementation and does not imply any limitations with regard to the environments in which different embodiments may be implemented. Many modifications to the depicted environments may be made based on design and implementation requirements.

Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, server computer program 105, and client computer program 111 are stored on one or more of the respective computer-readable tangible storage devices 830 of set of internal components 800a for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs server computer program 105 and client computer program 111 can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. The programs server computer program in search engine server computer 104; client computer program in client computing device 110 can be downloaded to respective client computing device 110 from an external computer via a network (for example, the Internet, a local area network or other, wide area network) and respective network adapters or interfaces 836. From the network adapters or interfaces 836, the programs server computer program 105 and client computer program 111 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for searching for web pages based on a user-recalled web page appearance. However, numerous modifications and substitutions can be made without deviating from the scope of the present invention. In this regard, each block in the flowcharts or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for searching for a previously visited web page, the method comprising the steps of:
 a first computer receiving a plurality of search parameters from a second computer after a user has placed first and second elements on a canvas of a user interface of the second computer, the plurality of search parameters including a parameter identifying a first characteristic of the first element and a parameter identifying a first weight of confidence in a recollection of the user that the first element has the first characteristic on the previously visited web page, the plurality of search parameters further including a parameter identifying a second characteristic of the second element and a parameter identifying a second weight of confidence in a recollection of the user that the second element has the second characteristic on the previously visited web page, wherein the first and second weights are automatically and respectively assigned to the first and second elements in a manner hidden from the user and based on an order in which the user has placed the first and second elements on the canvas, wherein a greater value is assigned to the first weight than the second weight based on the order, and wherein the order comprises placement by the user of the first element on the canvas followed by placement by the user of the second element on the canvas;
 the first computer searching for the first and second characteristics in a database including characteristics of elements of indexed web pages;
 the first computer finding a match between the first characteristic and a characteristic of a first element of an indexed web page of the indexed web pages and between the second characteristic and a characteristic of a second element of the indexed web page, wherein the first characteristic indicates that the first element is an image and wherein the characteristic of the first element of the indexed web page indicates that the first element of the indexed web page is an image and wherein the step of the first computer finding the match between the first characteristic and the characteristic of the first element of the indexed web page and between the second characteristic and the characteristic of the second element of the indexed web page comprises the step of the first computer determining that the first characteristic and the characteristic of the first element of the indexed web page both indicate an image;
 the first computer creating a list including an identification of the indexed web page; and
 the first computer sending the list to the second computer.

2. The method of claim 1, wherein the first weight of confidence represents total confidence in the recollection of the user that the first element has the first characteristic on the previously visited web page.

3. A computer program product comprising one or more computer-readable tangible storage devices and computer-readable program instructions which are stored on the one or more storage devices and when executed by one or more processors of the first computer of claim 1 perform the method of claim 1.

4. A computer system for searching for a previously visited web page, the computer system comprising:
 one or more computer-readable tangible storage devices, one or more processors, and one or more computer-readable memories;
 program instructions, stored on at least one of the one or more computer-readable tangible storage devices for execution by at least one of the one or more processors via at least one of the one or more computer-readable memories, to receive a plurality of search parameters from a computing device after a user has placed first and second elements on a canvas of a user interface of the computer device, the plurality of search parameters including a parameter identifying a first characteristic of the first element and a parameter identifying a first weight of confidence in a recollection of the user that the first element has the first characteristic on the previously visited web page, the plurality of search parameters further including a parameter identifying a second characteristic of the second element and a parameter identifying a second weight of confidence in a recollection of the user that the second element has the second characteristic on the previously visited web page, wherein the first and second weights are automatically and respectively assigned to the first and second elements in a manner hidden from the user and based on an order in which the user has placed the first and second elements on the canvas, wherein a greater value is assigned to the first weight than the second weight based on the order, and wherein the order comprises placement by the user of the first element on the canvas followed by placement by the user of the second element on the canvas;
 program instructions, stored on at least one of the one or more computer-readable tangible storage devices for execution by at least one of the one or more processors via at least one of the one or more computer-readable memories, to search for the first and second characteristics in a database including characteristics of elements of indexed web pages;
 program instructions, stored on at least one of the one or more computer-readable tangible storage devices for execution by at least one of the one or more processors via at least one of the one or more computer-readable memories, to find a match between the first characteristic and a characteristic of a first element of an indexed web page of the indexed web pages and between the second characteristic and a characteristic of a second element of the indexed web page, wherein the first characteristic indicates that the first element is a banner and wherein the characteristic of the first element of the indexed web page indicates that the first element of the indexed web page is a banner and wherein the program instructions to find the match between the first characteristic and the characteristic of the first element of the indexed web page and between the second characteristic and the characteristic of the second element of the indexed web page determine that the first characteristic and the characteristic of the first element of the indexed web page both indicate a banner;
 program instructions, stored on at least one of the one or more computer-readable tangible storage devices for execution by at least one of the one or more processors via at least one of the one or more computer-readable memories, to create a list including an identification of the indexed web page; and
 program instructions, stored on at least one of the one or more computer-readable tangible storage devices for execution by at least one of the one or more processors via at least one of the one or more computer-readable memories, to send the list to the computing device.

5. The computer system of claim 4, wherein the first weight of confidence represents total confidence in the recollection of the user that the first element has the first characteristic on the previously visited web page.

6. A computer program product for searching for a previously visited web page, the computer program product comprising:

one or more computer-readable tangible storage devices;

program instructions, stored on at least one of the one or more computer-readable tangible storage devices, to receive a plurality of search parameters from a computing device after a user has placed first and second elements on a canvas of a user interface of the computer device, the plurality of search parameters including a parameter identifying a first characteristic of the first element and a parameter identifying a first weight of confidence in a recollection of the user that the first element has the first characteristic on the previously visited web page, the search parameters further including a parameter identifying a second characteristic of the second element and a parameter identifying a second weight of confidence in a recollection of the user that the second element has the second characteristic on the previously visited web page, wherein the first and second weights are automatically and respectively assigned to the first and second elements in a manner hidden from the user and based on an order in which the user has placed the first and second elements on the canvas, wherein a greater value is assigned to the first weight than the second weight based on the order, and wherein the order comprises placement by the user of the first element on the canvas followed by placement by the user of the second element on the canvas;

program instructions, stored on at least one of the one or more computer-readable tangible storage devices, to search for the first and second characteristics in a database including characteristics of elements of indexed web pages;

program instructions, stored on at least one of the one or more computer-readable tangible storage devices, to find a match between the first characteristic and a characteristic of a first element of an indexed web page of the indexed web pages and between the second characteristic and a characteristic of a second element of the indexed web page, wherein the first characteristic indicates that the first element is a text list and wherein the characteristic of the first element of the indexed web page indicates that the first element of the indexed web page is a text list and wherein the program instructions to find the match between the first characteristic and the characteristic of the first element of the indexed web page and between the second characteristic and the characteristic of the second element of the indexed web page determine that the first characteristic and the characteristic of the first element of the indexed web page both indicate a text list;

program instructions, stored on at least one of the one or more computer-readable tangible storage devices, to create a list including an identification of the indexed web page; and program instructions, stored on at least one of the one or more computer-readable tangible storage devices, to send the list to the computing device.

7. The computer program product of claim 6, wherein the first weight of confidence represents total confidence in the recollection of the user that the first element has the first characteristic on the previously visited web page.

8. The method of claim 1, wherein the first characteristic comprises a type of the first element.

9. The method of claim 1, wherein the first characteristic comprises a position of the first element on the previously visited web page.

10. The method of claim 1, wherein the first characteristic comprises a size of the first element on the previously visited web page.

* * * * *